(No Model.)
J. C. REILLY.
CIRCUIT CONNECTING DEVICE.
No. 401,067. Patented Apr. 9, 1889.
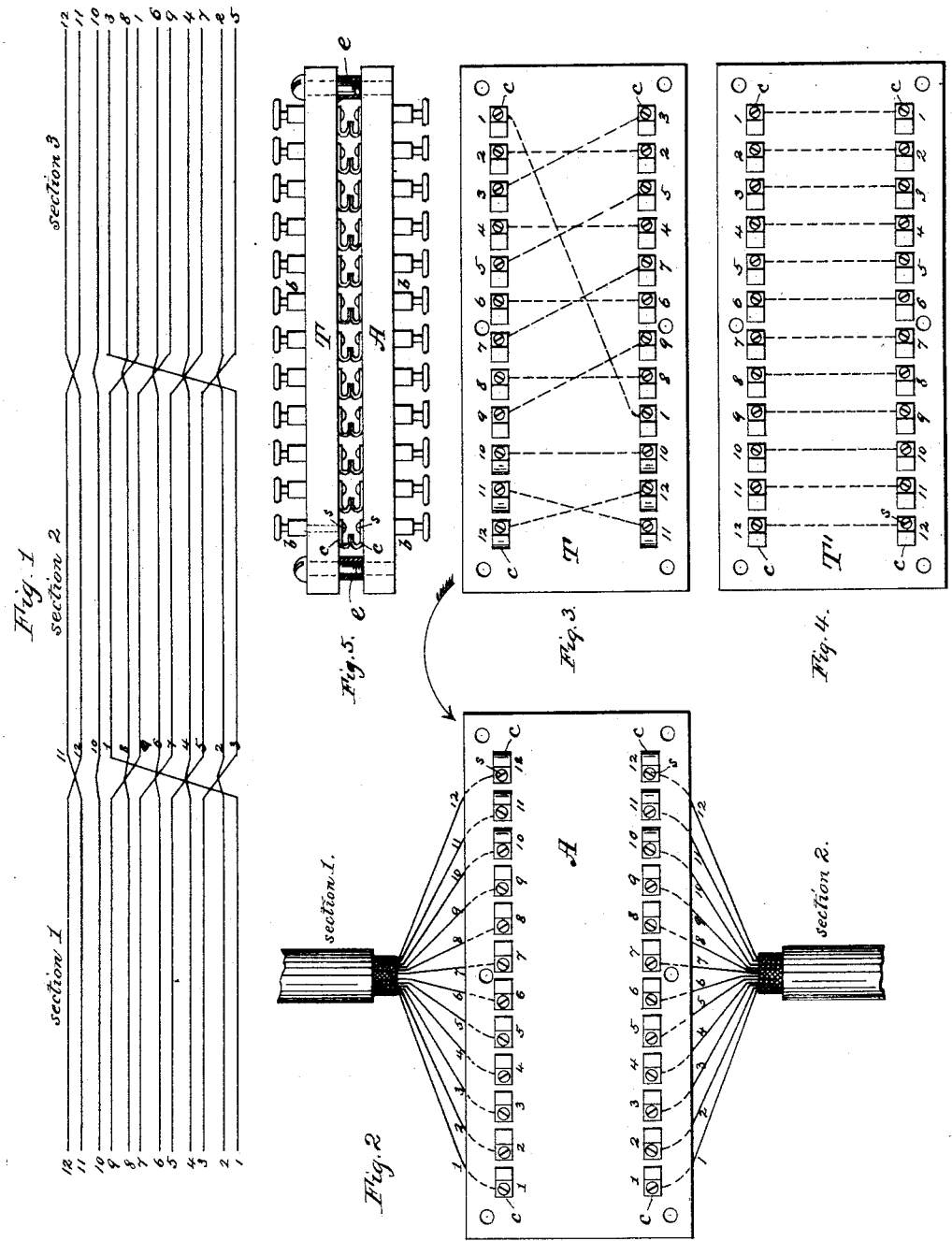
WITNESSES:
John C. Reilly, INVENTOR,
BY
ATTORNEYS.

UNITED STATES PATENT OFFICE.

JOHN C. REILLY, OF BROOKLYN, NEW YORK.

CIRCUIT-CONNECTING DEVICE.

SPECIFICATION forming part of Letters Patent No. 401,067, dated April 9, 1889.

Application filed February 13, 1889. Serial No. 299,788. (No model.)

*To all whom it may concern:*

Be it known that I, JOHN C. REILLY, a citizen of the United States, residing at Brooklyn, in the county of Kings and State of New York, have invented certain new and useful Improvements in Circuit-Connecting Devices; and I do hereby declare the following to be a full, clear, and exact description of the invention, such as will enable others skilled in the art to which it appertains to make and use the same.

This invention relates to the construction and arrangement of devices for connecting electric circuits, being more particularly intended for use in coupling the ordinary sections of electric cables in whatever manner may be required.

As the invention is more particularly intended for application to telephone-circuits, I will confine my description to such, with the remark, however, that it is applicable, also, to other electrical circuits, and I therefore do not confine the scope of the invention to telephone-circuits only.

In the use of cables in telephone-work the cables are now generally composed of the required number of insulated wires laid up in the cable in different ways—usually in twisted pairs—and in convenient lengths or sections. When placed in position, the wires of these sections are connected together in the direction of their length, forming one continuous cable. The wires are connected by a twist, joint, or sleeve, and each connection then insulated. When the wires of one section have been connected to the wires of the succeeding section—in pairs for metallic circuits or singly for ground-circuits—the whole joint is securely covered or sealed up. It has been found desirable in connecting up the wires of a cable to transpose or change their relation to each other at different points throughout the cable.

The object of this invention is to secure systematic transpositions between the various wires of the cable in the different sections, so that the full number of wires may be used for single or ground circuits, or part used for single circuits and part for metallic circuits, until such time as all are required for metallic-circuit use. When the wires are connected up in the ordinary manner, the transposition and restoration of the various circuits in each section is a work of great complication and expense. By my invention, however, the change can be made over a length of several miles in a few hours at slight expense.

The invention consists in the combination of a stationary plate of suitable form having the unconnected terminals of the cable-wires and a corresponding connecting-plate adapted to be brought into contact with the stationary plate and having registering-contacts thereon, which can be paired together in any desired manner.

The invention further consists in the arrangement and combination of parts, substantially as hereinafter fully described and claimed.

In the drawings which form part of this specification, Figure 1 is a diagram illustrating one of the present arrangements of circuits in an electric cable, wherein at the ends of given lengths of the cable the circuits are transposed by connecting the wires of one section to those of another in a different order. Fig. 2 is a plan view of my terminal-plate, with the wires of two adjacent cable-sections connected to contacts on the said plate. Fig. 3 is a corresponding view of what I call the "transposition-plate." Fig. 4 is a corresponding view of the connecting-plate used for completing the metallic circuits when required. Fig. 5 is an edge view showing the terminal-plates brought into operative connection.

In following out my invention I proceed as follows: I construct a terminal-plate, A, of any suitable insulating material—such, for instance, as hard rubber—and along one face of this I arrange two rows of contacts or clips, *c*, there being one in each row for each of the wires of the cable. These contacts or clips *c*, I prefer to form of spring metal bent over, as shown in Fig. 5, and they are fastened to the plate A by means of screws *s*, which pass through the plate and into any suitable form of binding-posts *b* on the other face of the plate A. These contacts are all alike, and are by preference arranged in regular order, as shown in Fig. 2, wire No. 1 of each section of the cable being directly connected to the binding-post of its respective contact No. 1. Thus connected there are two contacts, No. 1 occupying corresponding positions on the face of plate A, two contacts, No. 2, and so on throughout the entire number of wires in the cable-sections. I connect the respective contacts of one row to those of the other by means of the transposition-plate T, which is constructed in precisely the same way as the plate A—that is, it has the same number of contacts c of suitable form, and they occupy exactly corresponding positions, and the two plates are made so as to register together, and are provided with clamping-screws e or any other suitable devices for drawing the plates together and holding them in connected relation, as shown in Fig. 5.

In the arrangement illustrated at Fig. 2 it is obvious that there is no electrical connection between the respective wires of section 1 of the cable and those of section 2. This connection is brought about entirely by the plate T, and the order of connections depends upon the requirements at the time existing.

As shown in the drawings, plate T has the respective contacts c of one row connected to those of the other row in a predetermined manner by simply running wires across the back between the binding-posts b, attached to the plate, and these connections are shown in Figs. 3 and 4 by broken lines. Obviously, of course, instead of wires, either insulated or bare, the connections between the respective contacts may be made by suitably-arranged strips of metal.

In laying down the cable originally I insert the plate A in a suitable junction-box above or below the ground, according to circumstances, and each of the wires of section 1 is connected in regular order to one of the contacts c in one row, and each of the wires of the next section of the cable is connected in the same way to one of the contacts of the other row formed on plate A. If, now, it is desired to utilize all the wires of the cable by forming them into the now well-known transposed circuit arrangement, as illustrated in the diagram, Fig. 1, it is only necessary to make the corresponding connections on the plate T. The transpositions illustrated at the first junction in Fig. 1 are shown in Fig. 3 by the broken lines representing the wires which establish connection between the various contacts on the plate T, and each plate is arranged in accordance with the method of transposition adopted—such, for instance, as that shown in Fig. 1. I then place the plate T over the plate A and fasten them together, as already described, by screws or other devices. In this position connection is made from each of the wires of section 1 of the cable to the required corresponding wire of section 2 of the cable by means of the contact-clips of the two plates and the transposition-wires on the plate T, and, thus arranged, the entire capacity of the cable may be utilized for single or grounded circuits until such time as it may be necessary to use it for all-metallic purposes. In that event it is only necessary to prepare a set of plates similar to those shown at Fig. 4, where the connections are regular and uniform in pairs, and, having such plates in readiness, the junction-boxes have only to be opened, the plates T quickly removed, and the plates T' substituted therefor, and upon such substitution the entire cable is rearranged in continuous pairs, constituting the required all-metallic circuits.

I claim as my invention—

1. A connecting device for multiplex circuits, consisting of a plate fitted with two groups of contacts forming the terminals of the respective circuits to be connected, in combination with a second plate removably attached thereto and similarly fitted with two groups of contacts registering with the contacts of the first plate and having circuit-connections between the contacts of one row and those of the other row.

2. A connecting device for multiplex circuits, consisting of two plates adapted to be adjustably clamped together, each of their adjacent faces being fitted with corresponding contacts in two groups, one plate having permanent terminals for the circuits to be connected and the other plate having the required connections.

3. In a connecting device for multiplex circuits, a plate having two groups of contacts constituting the terminals of the circuits to be connected, both groups arranged in regular order, in combination with a circuit-transposing plate having two groups of registering contacts and wires or strips constituting the connections for said circuits and arranged in irregular order, in accordance with the scheme of transposition required, and means for bringing the corresponding contacts of the two plates together.

In testimony whereof I affix my signature in presence of two witnesses.

JOHN C. REILLY.

Witnesses:
T. J. McTIGHE,
W. L. CANDEE.